United States Patent [19]

Rocke et al.

[11] Patent Number: 4,779,829

[45] Date of Patent: Oct. 25, 1988

[54] WALL MOUNTABLE EYEGLASS HOLDER

[75] Inventors: David V. Rocke; John C. Knudson, both of Seattle, Wash.

[73] Assignee: C & H Supply, Inc., Seattle, Wash.

[21] Appl. No.: 530,763

[22] Filed: Sep. 8, 1983

[51] Int. Cl.⁴ .............................................. F16B 47/00
[52] U.S. Cl. ................................. 248/206.2; 248/302; 248/309.1
[58] Field of Search ............... 248/206.2, 205.5, 206.1, 248/302, DIG. 2, 362, 467, 309.1; 224/42.45 R; 211/87, 88

[56] References Cited

U.S. PATENT DOCUMENTS

| | | | |
|---|---|---|---|
| 2,021,496 | 11/1935 | Anger | 248/302 X |
| 2,226,684 | 12/1940 | Wortham | 248/DIG. 2 |
| 3,127,143 | 3/1964 | Terman | 248/302 X |
| 3,131,251 | 4/1964 | Ryan | 248/467 |
| 3,519,138 | 7/1970 | Murray | 248/DIG. 2 |
| 3,701,507 | 10/1972 | Bell | 248/362 X |

Primary Examiner—J. Franklin Foss
Attorney, Agent, or Firm—Joan H. Pauly

[57] ABSTRACT

Two receptacles (12) extend laterally from opposite sides of a center loop (4). The receptacles (12) and the loop (4) are preferably formed by a single piece of metal wire. The lens portions (42) of eyeglasses (40) are received into the receptacles (12), and loop (4) is received between lens portions (42) below the bridge (44) of the eyeglasses (40). The holder (2) is attached to a generally vertical support surface, such as a wall or windshield of a vehicle. One end (6) of loop (4) is bent downwardly to be essentially parallel to the support surface and defines an opening (8) for receiving a mounting member. The mounting member may be the shaft of a screw (20) or the stem (24') of a suction cup (22'). The screw (20) may be screwed directly into a support surface or into a threaded stem of a suction cup (22). Bent end (6) of loop (4) may be adjusted to accommodate support surfaces with varying slopes. The wire frame preferably has a nonabrasive coating.

13 Claims, 2 Drawing Sheets

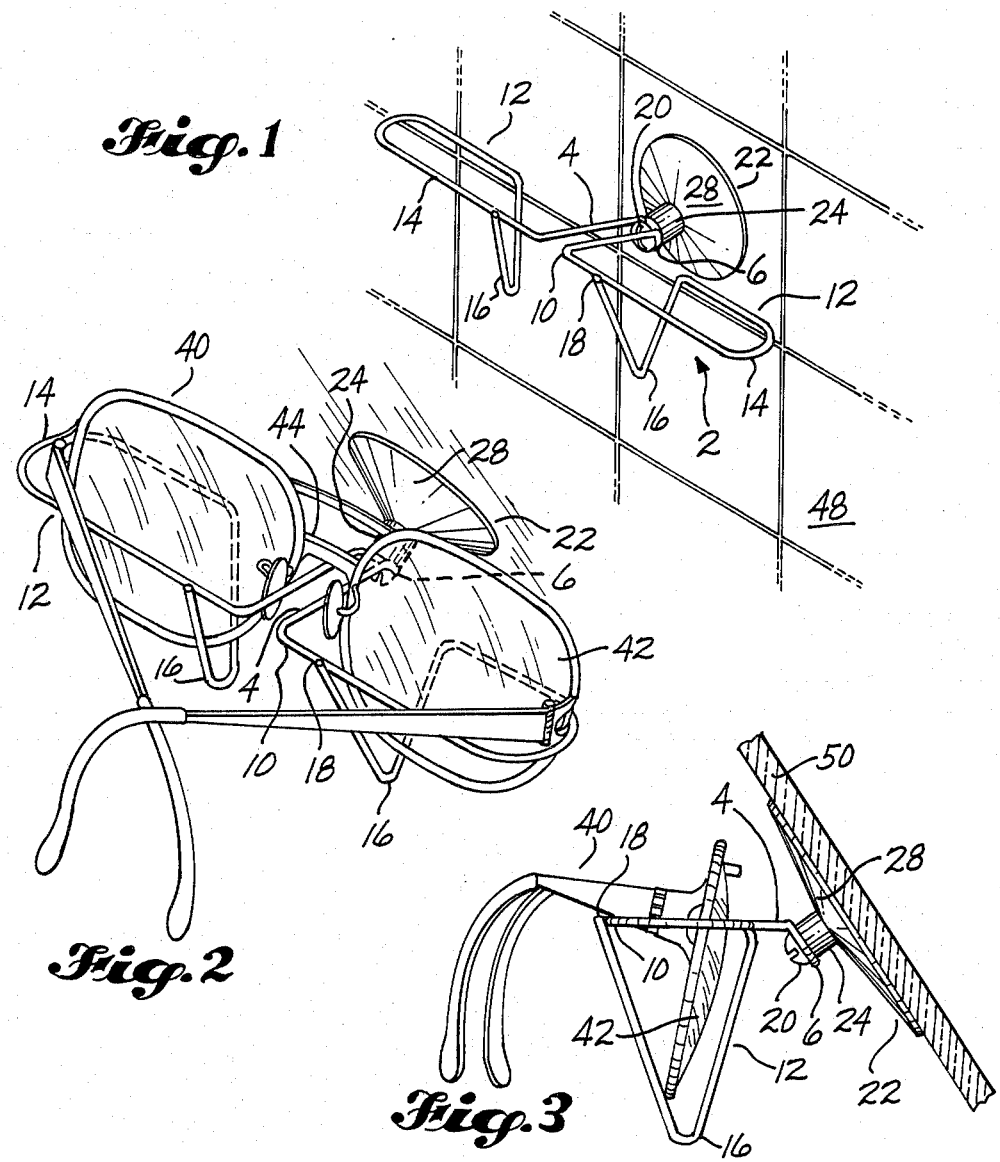
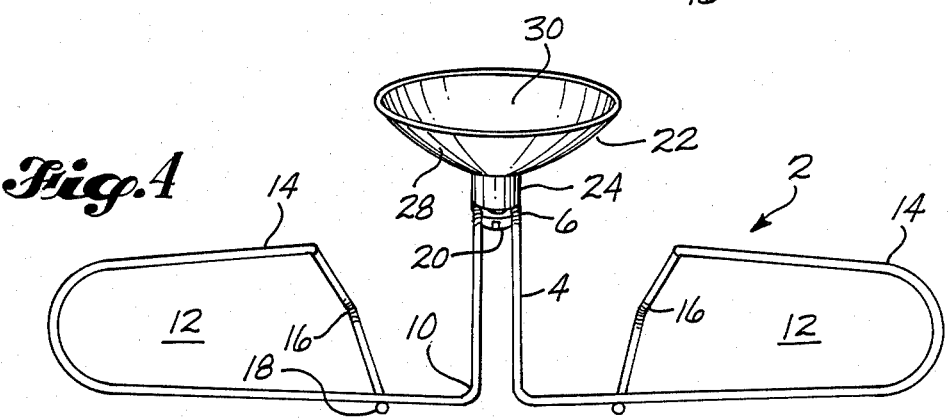

WALL MOUNTABLE EYEGLASS HOLDER

DESCRIPTION

1. Technical Field

This invention relates to mountable holders and, more particularly, to such a holder that is dimensioned to receive a pair of eyeglasses and that is mountable on a generally vertical support surface.

2. Background Art

There are many situations in which there is a need for a holder for eyeglasses or sunglasses that will keep the glasses safe and easily accessible. Such situations include skiing and similar situations in which it is desirable to leave a pair of glasses in a car within easy reach of a person sitting in the car or standing outside the car. Leaving the glasses on the seat of the car has the obvious disadvantage of placing the glasses in a position in which they may be lost because they fall off the seat or become wedged in the crevices of the seat, and in which they may be forgotten and damaged or broken by being sat upon. The alternative of leaving the glasses in the glove compartment of the car has the disadvantages of requiring the owner to rummage through the glove compartment to retrieve them, of making the glasses relatively inaccessible, and of subjecting the glasses to possible damage caused by contact with other articles in the glove compartment. Placing the glasses in a conventional eyeglass case alleviates these disadvantages only to the extent that it helps to prevent damage to the eyeglasses and has the additional disadvantage of further impeding quick access to the glasses.

In the home and in the office, there are many situations in which it is desirable to have a place to put glasses where they will be safe, easily accessible, and out of the way. Such situations include, for example, morning grooming in the bathroom. Glasses obviously cannot be worn while performing such activities as washing one's face, but putting glasses down at the edge of a sink places them in danger of being knocked off and damaged and causes them to occupy space which may be needed for other articles. If the glasses should be temporarily forgotten, these dangers are increased and it may be difficult for the owner to recall where they have been left. Similar disadvantages and problems are associated with finding a place to leave glasses at night when the wearer goes to sleep. In an office or other work situation, an eyeglass wearer may need glasses at times but not at other times and therefore has a need for a place to put the glasses where they will be safe, quickly accessible, and not in the way of the wearer's work.

The need for a holder for glasses is experienced by virtually all eyeglass and sunglass wearers, including those who at times wear contact lenses. A contact lens wearer has an especially great need for a safe place to leave his glasses while he is wearing his contact lenses so that he will not mislay his glasses and be unable to find them when he desires to remove the contact lenses.

DISCLOSURE OF THE INVENTION

The present invention is directed primarily toward providing a solution to the above problems by providing a mountable holder for eyeglasses and the like that is sufficiently versatile for use in a wide variety of situations.

According to a basic aspect of the invention, a holder for eyeglasses and the like comprises a generally horizontal center portion and a receptacle extending laterally from each side of said center portion. The center portion is dimensioned to be received between the lens portions of a pair of eyeglasses below the bridge of said eyeglasses. The center portion has an end portion that includes means for attaching the holder to a generally vertical support surface. Each receptacle is for receiving a lens portion of said eyeglasses and restraining said lens portion in a generally vertical position substantially perpendicular to said center portion.

According to another aspect of the invention, the holder further comprises a suction cup having engaging means for engaging said means for attaching the holder to a generally vertical support surface.

According to still another aspect of the invention, the means for attaching the holder includes an opening for receiving a mounting member therethrough. In one preferred embodiment of the invention, the holder further comprises a screw having a shaft that extends through said opening, and a suction cup, which suction cup has a substantially circular suction surface and an axial mounting stem opposite said suction surface with a hole for threadedly engaging the shaft of the screw. In another preferred embodiment of the invention, the holder further comprises a suction cup having a suction portion, a mounting stem, and a flange. The suction portion has a substantially circular suction surface. The mounting stem extends axially outwardly from the suction portion opposite the suction surface and has an inner large diameter portion and an outer small diameter portion. The flange extends radially from the outer end of the small diameter portion of the stem. The small diameter portion of the stem is dimensioned to be snugly received in said opening with the large diameter portion and the flange urged against said center portion of the holder on opposite sides of said opening.

According to a preferred aspect of the invention, said center portion and the receptacles comprise a wire frame. Preferably, this frame is formed by a single piece of wire. Also preferably, said center portion comprises a middle portion of said piece of wire bent to form a loop, and said means for attaching includes an opening, defined by one end of said loop, for receiving a mounting member therethrough. In the preferred embodiment, the other end of said loop is open and said wire extends laterally from each side of the other end of said loop and bends around back toward said center portion to define a generally upwardly directed open top portion of said receptacle, bends generally downwardly and upwardly to define a bottom portion of said receptacle, and terminates at and is attached to said top portion generally adjacent to said other end of said loop.

A feature of the invention is the provision of means for accommodating support surfaces with varying slopes. In embodiments of the invention having this feature, the end of the loop defining said opening is bent downwardly at an angle to be essentially parallel to a generally vertical support surface, and the wire is sufficiently flexible so that this angle can be adjusted with ordinary pliers to accommodate such varying slopes.

Another feature of the invention is providing the wire frame with a nonabrasive coating to prevent scratching or marring of eyeglass lenses or frames.

Holders constructed according to the invention have the advantage of being easily mountable so that eyeglasses and the like placed in the holders will not become mislaid or knocked onto a floor or other undesirable place. Holders constructed according to the invention can be mounted in any of a number of safe places where they and their contents will not be in the way of any activity and where their contents will be out of the reach of children, cats, and other mischief makers. Holders having the feature of a suction cup may be quickly and securely attached to any smooth support surface, such as a tile wall or a windshield of a vehicle, and may also be easily removed from their support surfaces and placed elsewhere as desired. In addition, in such holders the suction cup acts as a shock absorber in a moving vehicle to help prevent bumpy road conditions from causing glasses to bounce around in the holder. Holders having an opening for receiving a mounting member may be easily attached to any support surface capable of retaining the mounting member.

Holders of the invention that are constructed with a wire frame have the advantages of being simple and inexpensive to manufacture, highly durable, and lightweight. The wire frame construction also makes it possible for the holder to be easily adjustable to accommodate support surfaces with varying slopes. The open wire frame construction of the preferred embodiment will receive glasses of essentially any size and shape.

In summary, holders constructed according to the invention provide an inexpensive and highly versatile solution to the problems discussed above in connection with the need to be able to leave a pair of glasses in a place where they will be safe, easily accessible, and not in the way of any activity.

These and other advantages and features will become apparent from the detailed description of the best modes for carrying out the invention that follows.

BRIEF DESCRIPTION OF THE DRAWINGS

In the drawings, like element designations refer to like parts throughout, and:

FIG. 1 is a pictorial view of a first preferred embodiment of the holder attached to a tile wall.

FIG. 2 is a pictorial view of the holder shown in FIG. 1 attached to the inside of a windshield, with a pair of eyeglasses resting in the holder.

FIG. 3 is a side elevational view of the holder and eyeglasses shown in FIG. 2, with the windshield shown in section.

FIG. 4 is a top plan view of the holder shown in FIGS. 2 and 3.

BEST MODES FOR CARRYING OUT THE INVENTION

Figure 5:
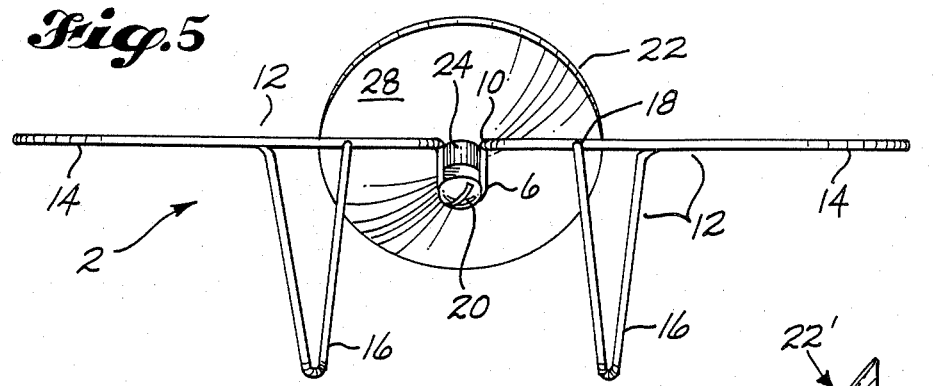
FIG. 5 is a front elevational view of the holder shown in FIGS. 2-4.
Figure 6:
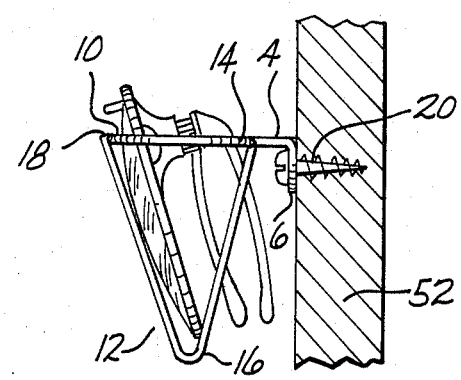
FIG. 6 is a side elevational view of the holder shown in FIGS. 1-5 holding a pair of glasses, with the suction cup removed and the holder attached to a wood surface.

The drawings show two embodiments of a holder 2 for eyeglasses and the like. Both embodiments are constructed according to the invention and also constitute the best modes of the invention currently known to the applicants. The holder 2 may be used in any of a variety of situations, including those discussed above. The holder 2 is designed to provide a safe and convenient resting place for eyeglasses or sunglasses, but it of course may be used as a holder for a variety of other objects. The open wire frame construction of the preferred embodiments makes it possible for the holder 2 to accommodate a large number of other objects of various shapes and sizes.

The holder 2 includes a generally horizontal center portion 4 and two receptacles 12 extending laterally from opposite sides of the center portion 4. Preferably, the center portion 4 and receptacles 12 are formed by a wire frame. In the preferred embodiments, this frame is in turn formed by a single piece of metal wire.

As shown in the drawings, the preferred embodiment of the center portion is formed by a middle portion of this piece of wire, bent to form a center loop 4. This loop 4 extends from the front of the holder 2 to the rear of the holder 2 which, when the holder 2 is mounted on a support surface, is adjacent to such support surface. The dimensions of the loop 4, especially the width, are chosen so that the loop 4 will be received between the lens portions 42 of a pair of eyeglasses 40 below the bridge 44 of the eyeglasses 40. The rear or inner end portion 6 of the loop 4 is closed, and the opposite end 10 is open, with the wire extending laterally from each side of this end 10 to form the receptacles 12.

The center portion 4 of the holder 2 includes means for attaching the holder 2 to a generally vertical support surface, such as a wall 48, 52 or a windshield 50. In the preferred embodiments, the attaching means is formed by the rear or inner closed end 6 of center loop 4. This end 6 defines an opening 8 for receiving a mounting member therethrough. The drawings show two possible forms which the mounting member may take. In the first preferred embodiment shown in FIGS. 1-6 the mounting member is a screw 20, and in the second preferred embodiment shown in FIG. 7 the mounting member is the stem 24' of a suction cup 22'. In either case, the looped end 6 of the wire frame surrounds the portion of the mounting member extending through the center loop 4 (the screw shaft or the narrow portion of the stem 24') on three sides.

Each of the receptacles 12 extending laterally from opposite sides of the center loop 4 receives a lens portion 42 of a pair of eyeglasses 40. The receptacles 12 position the lens portions 42 and restrain them in a position in which they are generally vertical and substantially perpendicular to center loop 4. The receptacles 12 prevent the lens portions 42, and thus the eyeglasses 40, from rotating on the center loop 4 and from tipping over into a more horizontal position. The exact locations of the areas of contact between the wire frame (including center loop 4) and the eyeglasses 40 are determined largely by the size and shape of the eyeglasses 40.

The wire forming the wire frame extends laterally from each side of the front open end 10 of the center loop 4. The wire extends laterally away from and perpendicular to end 10 of loop 4 and then bends around back toward loop 4 to define a generally upwardly directed open top portion 14 of the receptacle 12. The rear portion of the top 14 of the receptacle 12 does not extend all the way back to center loop 4 but rather only extends between about ½ and ⅔ of the distance back to loop 4. In other words, before reaching the center loop 4 the wire forming the wire frame changes direction again and bends generally downwardly and then upwardly to define a bottom portion 16 of the receptacle 12. Finally, the wire terminates at and is attached to the front of the top portion 14 of the receptacle 12 at a point 18 generally adjacent to the open end 10 of the loop 4. The attachment of the end of the wire to the top 14 of the receptacle 12 may be made by any of a variety of known means, such as spot welding.

The details of the construction of the frame of the holder 2 may of course be varied considerably without departing from the spirit and scope of the present invention. However, the preferred construction from a single piece of wire has the advantages of providing a frame that is easy and inexpensive to manufacture and very durable. The preferred construction shown in the drawings has the additional advantage of resulting in a holder 2 that is suitable for virtually any size or shape of eyeglasses or sunglasses and that may even be used to hold other kinds of objects, if desired.

The holder of the invention preferably includes a suction cup for mounting the holder onto a support surface. The suction cup mounting has the advantages of not requiring any alteration of the support surface, not marring or otherwise damaging the support surface, and being easily movable from one support surface to another. In addition, since the suction cup acts as a shock absorber in a moving vehicle, it helps to prevent marring or damage to glasses resting in the holder. The drawings show two different embodiments of a suction cup mounting for the holder 2. Each of these suction cups engages the opening 8 defined by the closed end 6 of the center loop 4.

In the first preferred embodiment of the suction cup shown in FIGS. 1–6, the suction cup 22 has a substantially circular suction portion 28 with a rearwardly directed suction surface 30 that attaches to a smooth support surface, such as a tile wall 48 or a windshield 50, in a well known manner. An axial mounting stem 24 extends from the suction portion 28 in a forward direction opposite the substantially circular suction surface 30. The stem 24 is coaxial with the suction portion 28. The stem 24 has a center axially directed hole for receiving and threadedly engaging the shaft of a screw 20. During assembly of the holder, the shaft of the screw 20 is placed through the opening 8 moving in a rearward direction and the suction cup 22 is rotated to threadedly engage the shaft of the screw 20 in the hole in stem 24. The connection is tightened an amount sufficient to urge the head of the screw 20 against the end 6 of loop 4 on one side of the opening 8 and to urge the outer end of the stem 24 against the other side of the opening 8. The tightening provides a secure attachment between the wire frame and the suction cup 22 and prevents rotation of the frame with respect to the suction cup 22.

Figure 7:
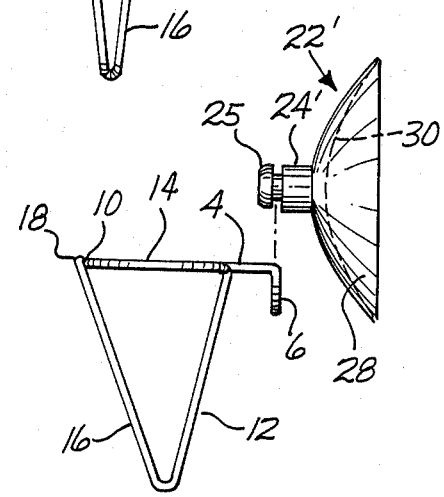
FIG. 7 is a side elevational view of a second preferred embodiment of the holder, with the modified suction cup shown detached from the wire frame.

The second preferred embodiment of the suction cup 22' is shown in FIG. 7. Like the first embodiment, suction cup 22' has a suction portion 28 with a substantially circular suction surface 30. The embodiments differ in the structure of their stem portions. The stem 24' of suction cup 22' extends axially outwardly from the suction portion 28 opposite the suction surface 30 and has an inner large diameter portion and an outer small diameter portion. A flange 25 extends radially from the outer end of the small diameter portion. The narrow small diameter portion of the stem 24' between the flange 25 and the large diameter portion is dimensioned to be snugly received in the opening 8 in loop 4. When the narrow portion of the stem 24' has been positioned within the opening 8, the front surface of the large diameter portion and the rear surface of the flange 25 are urged against the end 6 of the loop 4 on opposite sides of the opening 8. Preferably, the sides of the narrow portion of the stem 24' are also urged against the sides of the opening 8 to insure that the frame will not rotate with respect to the suction cup 22'. The flange 25 is preferably sufficiently flexible so that it may be folded to pass through the opening 8 to assemble or disassemble the holder 2 by attaching or detaching the suction cup 22' to or from the wire frame. Suction cup 22' could also be attached to the frame by sliding the narrow portion of the stem 24' through loop 4 from open end 10 to closed end 6, which forms opening 8.

Either of the two embodiments of the suction cup 22, 22' provides a versatile and durable, but simple and inexpensive mounting for the wire frame. Each of the embodiments has its own particular advantages. For example, one advantage of the first embodiment is that it has a built-in alternative means for attaching the holder 2 to a support surface. With the suction cup 22 removed, the holder 2 may be mounted by directly engaging a support surface, such as a wooden wall member 52, with the screw 20. (See FIG. 6). This alternative means of attachment would be particularly desirable in a relatively permanent installation of the holder 2 in a place where a smooth support surface for engaging the suction cup 22 is not readily available. An example of one of the advantages of the second embodiment of the suction cup 22' is that it requires fewer parts.

The suction cup 22, 22' may be made from a variety of suitable materials, such as vinyl plastic. The hole in the stm 24 of the first embodiment may be made self-threading to decrease the cost of manufacture and insure a tight threaded connection.

Figure 8:
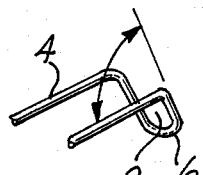
FIG. 8 is a fragmentary pictorial view of the mounting end of the center loop of the wire frame, adjusted for mounting on the inside of a windshield.
Figure 9:
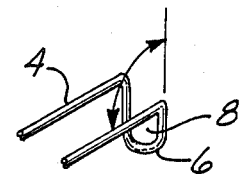
FIG. 9 is like FIG. 8, except that the mounting end is adjusted for mounting on a vertical wall.

The end 6 of loop 4 that defines opening 8 is bent downwardly at an angle to be essentially parallel to a generally vertical support surface. Preferably, the angle of the bend is adjustable so that the holder can be attached to various support surfaces with varying slopes. For example, the bend would be greater for a truly vertical support surface, such as a wall, and less for a support surface that slopes inwardly from bottom to top, such as the inside of a windshield. (See FIGS. 1, 6, 7, and 9 and FIGS. 2–5 and 8, respectively.) It is desirable to adjust the angle of bend so that the tops 14 of the receptacles 12 will be generally horizontal when the holder 2 is attached to the support surface and the eyeglasses 40 will be supported in a generally vertical position. In the preferred embodiment, the adjustability of the holder 2 is provided by simply making the wire sufficiently flexible so that the angle of bend can be adjusted with ordinary pliers. FIGS. 8 and 9 illustrate the two angular orientations that the applicants anticipate will be suitable for most use situations. Of course, end 6 may also be bent downwardly at other angles and may even be bent upwardly, if desired.

The preferred material for constructing the center portion 4 and receptacles 12 of the holder 2 is a single piece of metal wire that is sufficiently rigid to hold its shape and withstand reasonable abuse but sufficiently flexible to allow for the above-described adjustment with a pair of ordinary pliers. Preferably, the frame formed by the single piece of wire has a nonabrasive coating to prevent scratching or marring of eyeglass lenses (plastic or glass) or eyeglass frames. The coating preferably will withstand bending of the wire with pliers. An example of a type of coating that has the desired characteristics is Corvel (Trademark) NCA-77 nylon coating, manufactured by the Polymer Corporation of Reading, Pa.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the present invention as defined by the following claims.

What is claimed is:

1. A holder for eyeglasses and the like, comprising:
a generally horizontal center portion dimensioned to be received between the lens portions of a pair of eyeglasses below the bridge of said eyeglasses; said center portion having an end portion that includes means for attaching the holder to a generally vertical support surface; and
a receptacle extending laterally and downwardly from each side of said center portion for receiving a lens portion of said eyeglasses and restraining said lens portion in a generally vertical position substantially perpendicular to said center portion.

2. A holder as recited in claim 1, which further comprises a suction cup having engaging means for engaging said means for attaching the holder to a generally vertical support surface.

3. A holder as recited in claim 1, in which said means includes an opening for receiving a mounting member therethrough.

4. A holder as recited in claim 3, which further comprises a screw having a shaft that extends through said opening; and a suction cup having a substantially circular suction surface, and an axial mounting stem opposite said suction surface with a hole for threadedly engaging the shaft of the screw.

5. A holder as recited in claim 3, which further comprises a suction cup having a suction portion with a substantially circular suction surface, a mounting stem extending axially outwardly from said suction portion opposite said suction surface and having an inner large diameter portion and an outer small diameter portion, and a flange extending radially from the outer end of the small diameter portion of the stem; said small diameter portion of the stem being dimensioned to be snugly received in said opening with said large diameter portion and said flange urged against said center portion on opposite sides of said opening.

6. A holder as recited in claim 1, in which said center portion and said receptacles comprise a wire frame.

7. A holder as recited in claim 6, in which said frame is formed by a single piece of wire.

8. A holder as recited in claim 7, in which said center portion comprises a middle portion of said piece of wire bent to form a loop; and said means includes an opening, defined by one end of said loop, for receiving a mounting member therethrough.

9. A holder as recited in claim 8, in which said one end of said loop is bent downwardly at an angle to be essentially parallel to a generally vertical support surface, and said wire is sufficiently flexible so that said angle can be adjusted with ordinary pliers to accommodate support surfaces with varying slopes.

10. A holder as recited in claim 8, in which the other end of said loop is open; and said wire extends laterally from each side of the other end of said loop and bends around back toward said center portion to define a generally upwardly directed open top portion of said receptacle, bends generally downwardly and upwardly to define a bottom portion of said receptacle, and terminates at and is attached to said top portion generally adjacent to said other end of said loop.

11. A holder as recited in claim 6, in which said frame has a nonabrasive coating to prevent scratching or marring of eyeglass lenses or frames.

12. A holder for eyeglasses and the like, comprising a wire frame including:
a generally horizontal center loop dimensioned to be received between the lens portions of a pair of eyeglasses below the bridge of said eyeglasses; said center loop having a first end that includes means for attaching the holder to a generally vertical support surface, and an open second end; and
a receptacle extending laterally and downwardly from each side of said center loop for receiving a lens portion of said eyeglasses and restraining said lens portion in a generally vertical position substantially perpendicular to said center loop; each suction receptacle being formed by a portion of the wire frame that extends laterally from the corresponding side of said second end of said loop and bends around back toward said loop to define a generally upwardly directed open top portion of the receptacle, bends generally downwardly and upwardly to define a bottom portion of said receptacle, and terminates at and is attached to said top portion generally adjacent to said second end of said loop.

13. A holder as recited in claim 12, in which said means for attaching includes an opening, defined by said first end of said loop, for receiving a mounting member therethrough; and in which said first end of said loop is bent downwardly at an angle to be essentially parallel to a generally vertical support surface, and said wire is sufficiently flexible so that said angle can be adjusted with ordinary pliers to accommodate support surfaces with varying slopes.

* * * * *

UNITED STATES PATENT AND TRADEMARK OFFICE
CERTIFICATE OF CORRECTION

PATENT NO. : 4,779,829

DATED : October 25, 1988

INVENTOR(S) : David V. Rocke and John C. Knudson

It is certified that error appears in the above-identified patent and that said Letters Patent is hereby corrected as shown below:

Column 6, line 33, "stm" should be -- stem --.

Column 8, 13th and 14th lines of claim 12, "suction" should be -- such --.

Signed and Sealed this

Thirtieth Day of May, 1989

Attest:

DONALD J. QUIGG

Attesting Officer

Commissioner of Patents and Trademarks